(12) United States Patent
Tabata et al.

(10) Patent No.: US 8,931,806 B2
(45) Date of Patent: Jan. 13, 2015

(54) TONGUE AND SEAT BELT APPARATUS USING TONGUE

(75) Inventors: Yuuki Tabata, Tokyo (JP); Yoshihiko Kawai, Tokyo (JP); Motonori Okano, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/118,771

(22) PCT Filed: Mar. 16, 2012

(86) PCT No.: PCT/JP2012/001836
§ 371 (c)(1),
(2), (4) Date: Nov. 19, 2013

(87) PCT Pub. No.: WO2012/160737
PCT Pub. Date: Nov. 29, 2012

(65) Prior Publication Data
US 2014/0070596 A1 Mar. 13, 2014

(30) Foreign Application Priority Data

May 20, 2011 (JP) .................................. 2011-113133
Mar. 6, 2012 (JP) .................................. 2012-048830

(51) Int. Cl.
*B60R 22/34* (2006.01)

(52) U.S. Cl.
USPC ........ 280/801.1; 280/807; 297/474; 24/593.1

(58) Field of Classification Search
CPC ........... B60R 22/3405; B60R 22/1855; A44B 11/2561; A44B 11/04
USPC ............... 280/801.1, 807, 808; 297/474, 475; 24/593.1
See application file for complete search history.

(56) References Cited

U.S. PATENT DOCUMENTS

| 2,936,500 | A | * | 5/1960 | Elsner | ............................ 24/196 |
| 8,312,604 | B2 | * | 11/2012 | Heym et al. | .................. 24/593.1 |
| 2008/0018165 | A1 | | 1/2008 | You | |
| 2013/0154335 | A1 | * | 6/2013 | Tabata et al. | .................. 297/474 |

FOREIGN PATENT DOCUMENTS

| JP | 10-152019 A | 6/1998 |
| JP | 2006-036186 A | 2/2006 |
| JP | 2009-166586 A | 7/2009 |
| JP | 2012-071640 | 4/2012 |
| WO | WO-2009/043837 A1 | 4/2009 |

OTHER PUBLICATIONS

International Search Report; PCT/JP2012/001836; Apr. 7, 2012; 1 page.

* cited by examiner

*Primary Examiner* — Faye M. Fleming
(74) *Attorney, Agent, or Firm* — Foley & Lardner LLP

(57) ABSTRACT

A tongue for a seat belt system. The tongue is configured to allow a seat belt to smoothly slide thereon at normal times and that is capable of preventing stretch of a lap belt in the event of emergency. The seat belt sliding unit includes a predetermined number of the protrusions disposed in the first and second concave portions and. The first protrusion has a flat or substantially flat end surface on the shoulder belt side, a flat or substantially flat end surface on the lap belt side, and an arc-like top end. An angle formed by the imaginary line between the topmost end of the protrusion and an arc center of an outer peripheral surface of the concave portions and the end surface on the shoulder belt side is less than an angle formed by the imaginary line and the end surface on the lap belt side.

15 Claims, 9 Drawing Sheets

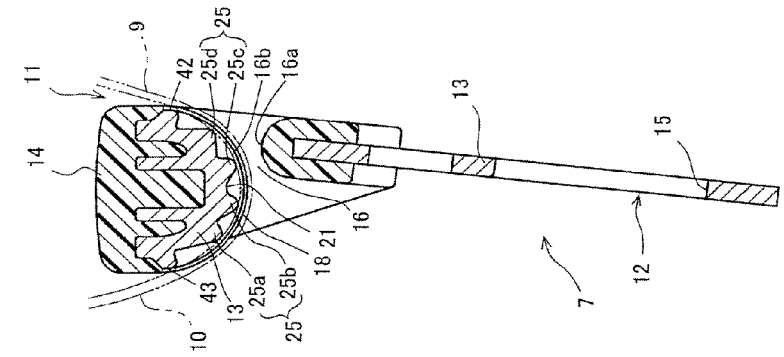
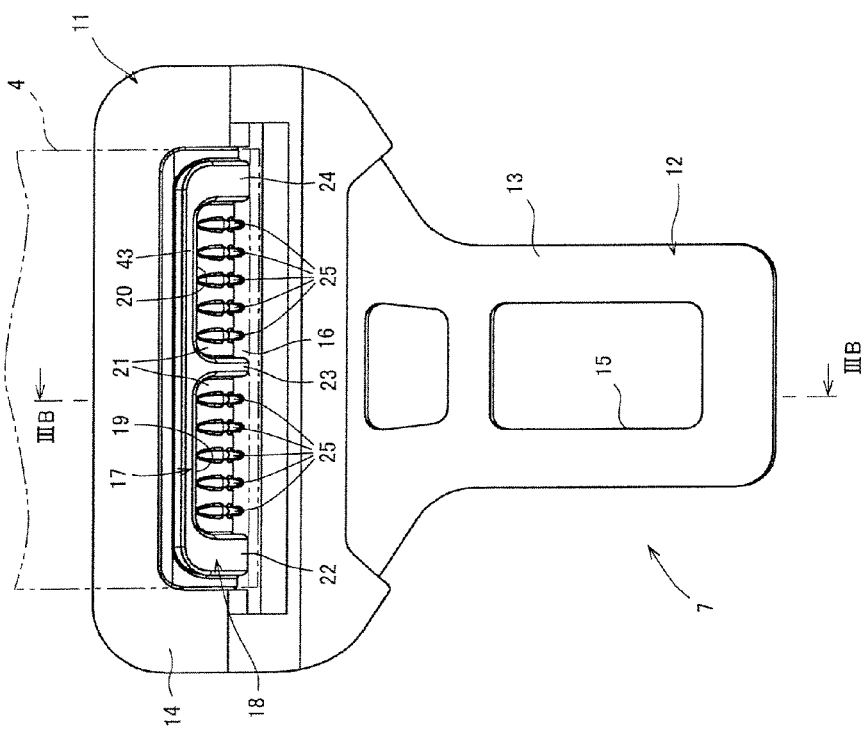
FIG. 3(B)
FIG. 3(A)

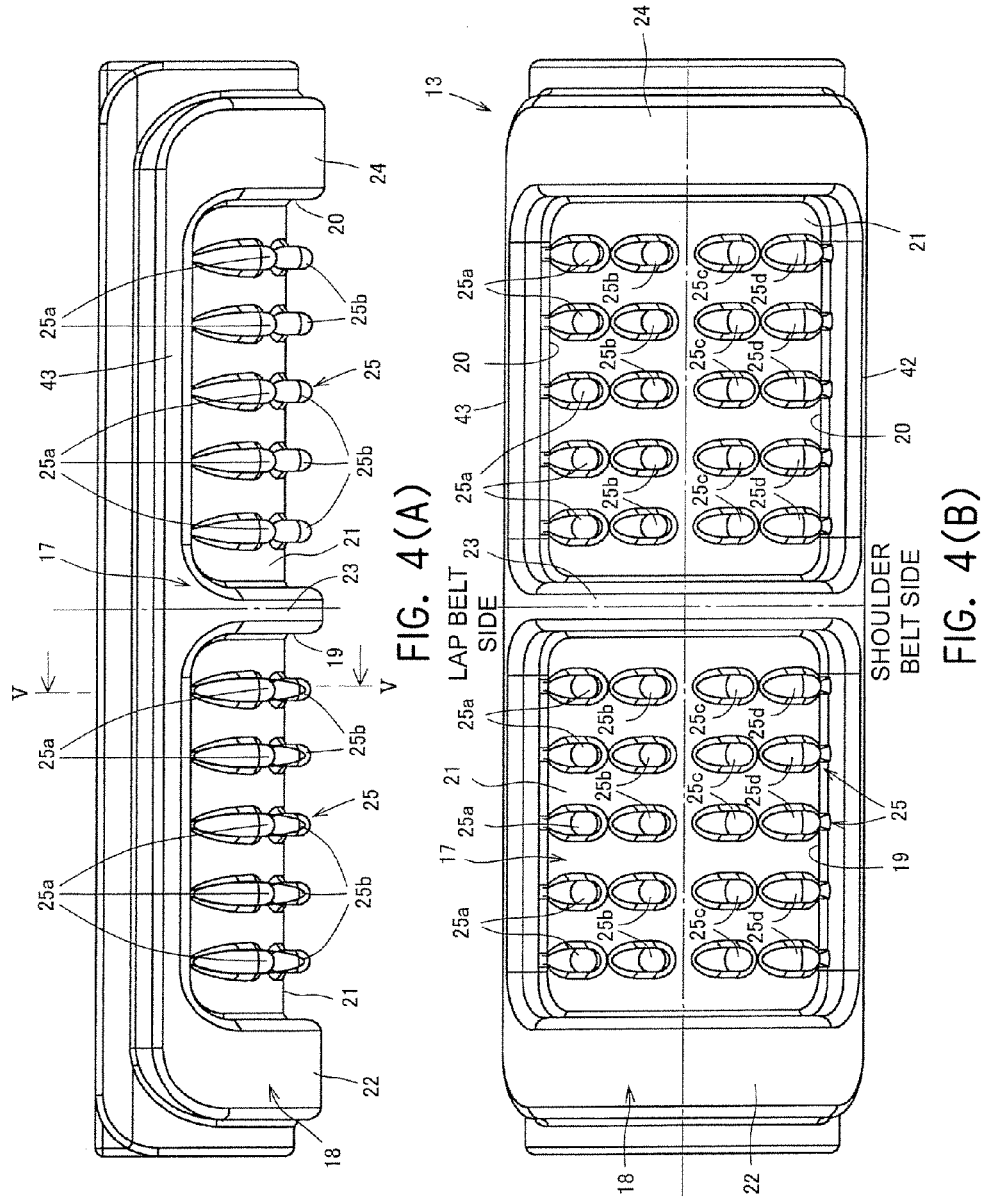

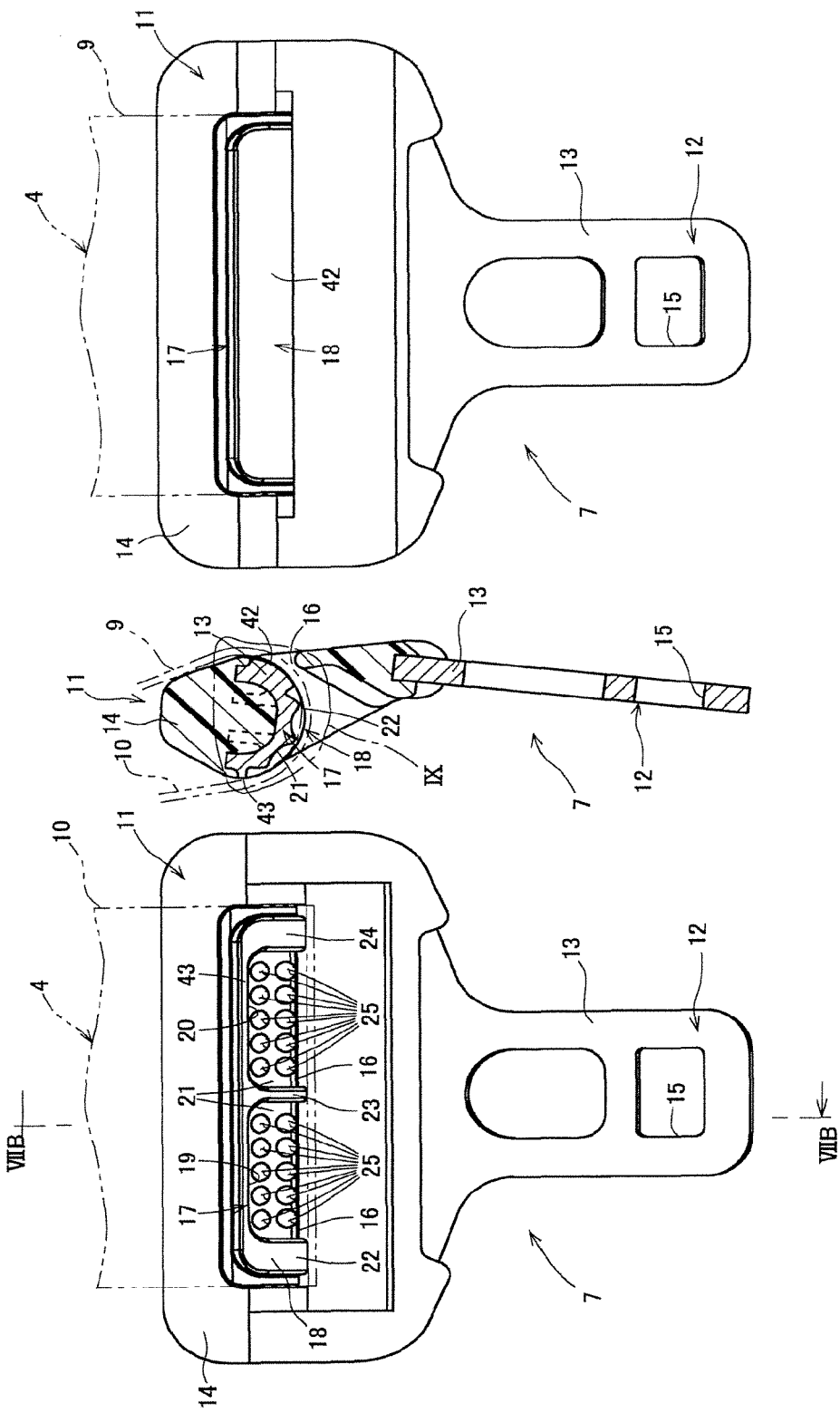

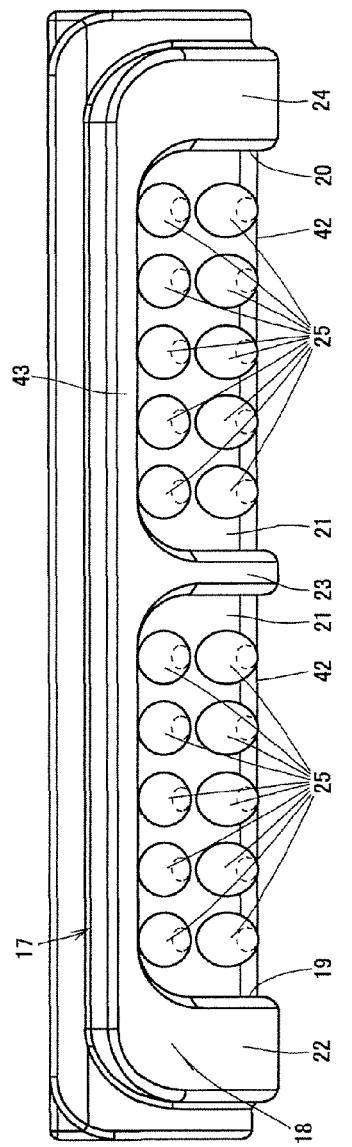
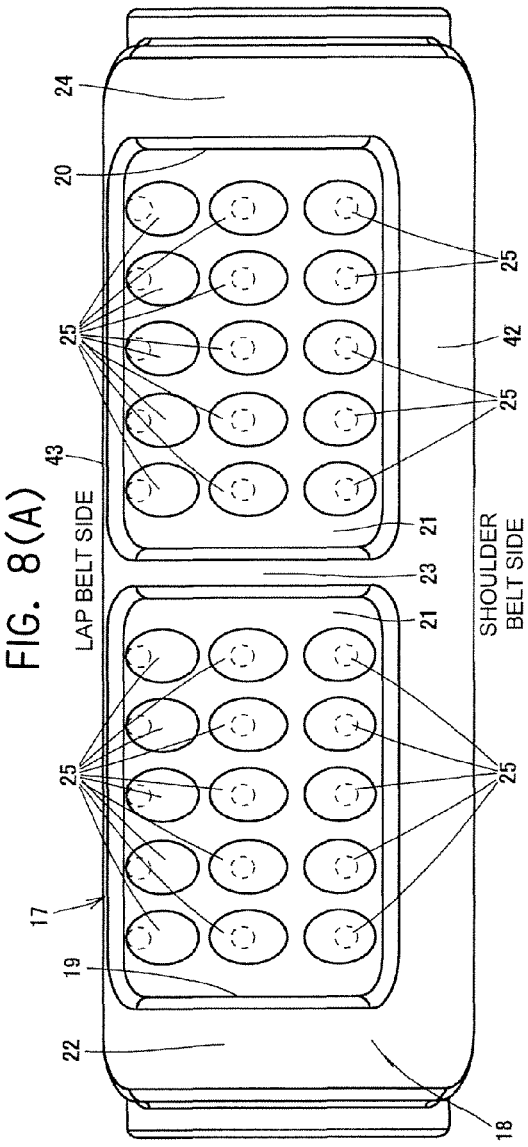
FIG. 8(A)
FIG. 8(B)

TONGUE AND SEAT BELT APPARATUS USING TONGUE

TECHNICAL FIELD

The present invention relates to a tongue used in a seat belt, slidably supported by the seat belt, and engaged with a buckle and a seat belt apparatus using the tongue.

BACKGROUND ART

In existing seat belt apparatuses mounted on a seat of a vehicle, such as an automobile, an occupant is restrained by a seat belt in the event of an emergency in which a deceleration greater than a normal deceleration is applied to the vehicle, such as in the event of collision (hereinafter simply referred to "in the event of an emergency"). Examples of such seat belt apparatuses include a three-point seat belt apparatus, which has been widely known and used. In the widely known three-point seat belt apparatuses, a seat belt withdrawn from a seat belt retractor is guided by a belt guide anchor, and a top end of the seat belt is secured to the body structure of the vehicle. The seat belt guided by the belt guide anchor slidably supports a tongue. In such a case, the seat belt is slidably inserted into an elongate seat belt insertion hole of the tongue. Thereafter, by engaging the tongue with the buckle secured to the body structure of the vehicle, the seat belt can be worn by the occupant.

When a seat belt is worn by an occupant, the seat belt located between the belt guide anchor and the tongue functions as a shoulder belt that passes across the shoulder and chest of the occupant. In addition, the seat belt located between the end secured to the body structure of the vehicle and the tongue functions as a lap belt that passes across the lap (the waist) of the occupant. In the event of an emergency, a lock mechanism of the seat belt retractor operates and, thus, withdrawal of the seat belt is prevented. In this manner, the shoulder belt restrains the shoulder and chest of the occupant, and the lap belt restrains the lap of the occupant.

In general, in such seat belt apparatuses, even when the lock mechanism of the seat belt retractor operates in the event of an emergency and prevents withdrawal of the seat belt, the lap belt slightly stretches due to the force of inertia of the occupant. Accordingly, it is difficult for the lap belt to effectively restrain the occupant.

Therefore, the following tongue has been developed. That is, in a normal operation performed by a seat belt, the friction between the seat belt and a seat belt sliding surface of the tongue is reduced and, thus, the seat belt smoothly slides on the tongue. In contrast, in the event of an emergency, the friction between the seat belt and the seat belt sliding surface is increased and, thus, the seat belt negligibly moves toward the lap belt (refer to, for example, PTL 1).

According a tongue described in PTL 1, a seat belt sliding surface of a seat belt insertion hole of the tongue has a plurality of axis-direction grooves each substantially linearly extending in the length direction of the seat belt insertion hole in series and a plurality of circumferential-direction grooves each extending in a direction substantially perpendicular to the length direction of the seat belt insertion hole in series. In such a case, the axis-direction grooves and the circumferential-direction grooves are formed over the entire area of the seat belt sliding surface of the elongate seat belt insertion hole in the length direction. In a normal operation of the seat belt, the seat belt virtually slides on the top end of a convex portion formed by the axis-direction groove and circumferential-direction groove. In this manner, friction between the seat belt and the seat belt sliding surface of the tongue is reduced. As a result, in a normal operation of the seat belt, the seat belt smoothly slides on the tongue. In contrast, in the event of an emergency, two portions of the seat belt located on either side of the tongue are pulled due to the force of inertia of the occupant. Thus, the tension force of the seat belt increases, and the seat belt sinks into the axis-direction grooves and the circumferential-direction grooves due to the increased tension force. Accordingly, friction between the seat belt and the seat belt sliding surface increases. As a result, in the event of an emergency, the seat belt negligibly moves toward the lap belt and, thus, stretch of the lap belt is prevented. By preventing stretch of the lap belt in this manner in the event of an emergency, effective restraint of the occupant using the lap belt can be achieved.

In addition, according to PTL 1, the seat belt sliding surface includes a plurality of linear protrusions each substantially linearly extending in the length direction of the seat belt insertion hole in series. The linear protrusions protrude from the seat belt sliding surface at predetermined intervals in the circumferential direction. By using such linear protrusion, friction between the seat belt and the seat belt sliding surface occurring in the event of an emergency can be changed from that in the normal operation of the seat belt. In such a case, in the normal operation of the seat belt, the seat belt slides on only the surfaces of the linear protrusions and, thus, friction between the seat belt and the seat belt sliding surface is reduced. In contrast, in the event of an emergency, the linear protrusions lean toward the lap belt due to an increased tension force of the seat belt. Accordingly, the seat belt also slides on the surfaces of other portions of the seat belt sliding surface. As a result, the friction between the seat belt and the seat belt sliding surface can be increased.

Furthermore, according to PTL 1, a seat belt sliding surface has a plurality of resin members protruding therefrom. By using such resin members, friction between the seat belt and the seat belt sliding surface occurring in the event of an emergency can be changed from that in the normal operation of the seat belt. In such a case, in the normal operation of the seat belt, the seat belt slides on only the surfaces of the resin members and, thus, friction between the seat belt and the seat belt sliding surface is reduced. In contrast, in the event of an emergency, the resin members get crushed or cut away by an increased tension force of the seat belt. Accordingly, the seat belt also slides on the surfaces of other portions of the seat belt sliding surface. As a result, the friction between the seat belt and the seat belt sliding surface can be increased.

CITATION LIST

Patent Literature

PTL 1: JP 2009-166586 A

SUMMARY OF INVENTION

Technical Problem

According to the tongue described in PTL 1, the axis-direction grooves that significantly increase the friction between the seat belt and the seat belt sliding surface are substantially linearly formed in the entire surface of the seat belt sliding surface in the length direction of the seat belt insertion hole in series. Accordingly, when the tension force of the seat belt increases in the event of an emergency, the seat belt does not effectively sink into the axis-direction grooves that substantially linearly extend. As a result, it is difficult to obtain large friction between the seat belt and the seat belt sliding surface by using the axis-direction grooves in the event of an emergency.

Like the above-described axis-direction grooves, the linear protrusions are substantially linearly formed in the entire surface of the seat belt sliding surface in the length direction of the seat belt insertion hole in series. Accordingly, when the tension force of the seat belt increases in the event of an emergency, the linear protrusions do not effectively bite into the seat belt. As a result, it is difficult to effectively obtain large friction between the seat belt and the seat belt sliding surface by using the linear protrusions in the event of an emergency. In addition, in the event of an emergency, the linear protrusions only lean and are in contact with the seat belt sliding surface. Thus, it is difficult to more effectively obtain large friction between the seat belt and the seat belt sliding surface. Furthermore, the resin members protruding from the seat belt sliding surface are formed so as to get crushed or cut away in the event of an emergency. Accordingly, like the protrusions, in the event of an emergency, the resin members are only in contact with the normal seat belt sliding surface. Thus, it is difficult to more effectively obtain large friction between the seat belt and the seat belt sliding surface. As a result, according to the tongue described in PTL 1, although the tongue can provide some effect of preventing stretch of the lap belt in the event of an emergency, further effective prevention of stretch of the lap belt is needed in the event of an emergency.

In addition, when the tension force of the seat belt increases in the event of an emergency, the seat belt sinks into the axis-direction grooves or the seat belt is bit by the linear protrusions. Even in such a case, the strength of the seat belt needs to be maintained so as to support the increased tension force.

Furthermore, the cross-sectional shapes of the axis-direction groove, the circumferential-direction groove, the linear protrusion, and the resin member taken along the sliding direction of the seat belt on the shoulder belt side are substantially the same as those on the lap belt side. That is, the cross-sectional shapes of the axis-direction groove, the circumferential-direction groove, the linear protrusion, and the resin member taken along the sliding direction of the seat belt do not have directivity with respect to the sliding direction of the seat belt. Thus, according to the tongue described in PTL 1, it is difficult to effectively change the amount of friction between the seat belt and the seat belt sliding surface occurring in the event of an emergency from that in the normal operation of the seat belt for any one of the axis-direction groove, the circumferential-direction groove, the protrusion, and the resin member. Thus, according to the tongue described in PTL 1, although a certain level of operability of the seat belt is maintained, further effective operability of the seat belt is needed.

Still furthermore, in a normal operation of the seat belt, it is desirable that when the seat belt is inserted into the elongate seat belt insertion hole of the tongue, the seat belt be negligibly twisted and, thus, friction between the seat belt and the seat belt sliding surface be low.

Accordingly, an object of the present invention is to provide a tongue capable of increasing the occupant restraint performance and the operability of the seat belt and a seat belt apparatus that uses the tongue by allowing the tongue to smoothly slide on the seat belt in a normal operation and effectively preventing stretch of a lap belt in the event of an emergency.

In addition, another object of the present invention is to provide a tongue capable of further increasing the occupant restraint performance and the operability of the seat belt and ensuring the strength of the seat belt and a seat belt apparatus that uses the tongue by allowing the tongue to smoothly slide on the seat belt in a normal operation and effectively preventing stretch of a lap belt in the event of an emergency.

Solution to Problem

To solve the above-described problems, according to the present invention, a tongue slidably supported by a seat belt, where the tongue partitions the seat belt into a shoulder belt and a lap belt and the tongue is capable of being engaged with a buckle, is characterized in that it includes an elongate seat belt insertion hole configured to allow the seat belt to be inserted therethrough and a seat belt sliding unit configured to form part of the seat belt insertion hole, where the seat belt sliding unit includes a seat belt sliding surface that allows the seat belt to slide thereon. The seat belt sliding unit includes a predetermined number of concave portions in the seat belt sliding surface and a predetermined number of protrusions independently disposed in the concave portions.

In addition, the tongue according to the present invention is characterized in that each of the predetermined number of protrusions is provided in the concave portion so as not to protrude outwardly beyond the seat belt sliding surface.

Furthermore, the tongue according to the present invention is characterized in that the predetermined number of protrusions are independently disposed in the concave portions in a dotted pattern.

Still furthermore, the tongue according to the present invention is characterized in that each of the predetermined number of protrusions has a substantially triangular cross section in a direction that is perpendicular or substantially perpendicular to the seat belt insertion hole, a flat or substantially flat end surface located on the shoulder belt side, and a flat or substantially flat end surface located on the lap belt side. For at least some of the predetermined number of protrusions, an acute angle formed by an imaginary line (a normal line) drawn from the topmost end of the protrusion to an arc center of an outer peripheral surface of the concave portion and the end surface of the protrusion on the shoulder belt side is less than an acute angle formed by the imaginary line (the normal line) and the end surface on the lap belt side, and a top end at which the end surface of the protrusion on the shoulder belt side intersects with the end surface on the lap belt side is formed in an arc shape.

Still furthermore, the tongue according to the present invention is characterized in that each of the predetermined number of protrusions has a substantially triangular cross section in a direction that is perpendicular or substantially perpendicular to the seat belt insertion hole, and each of the protrusions includes a flat or substantially flat end surface located on the shoulder belt side and a flat or substantially flat end surface located on the lap belt side. For at least some of the predetermined number of protrusions, an intersection point between an imaginary line (a normal line) drawn from the topmost end of the protrusion to an arc center of an outer peripheral surface of the concave portion and an imaginary circular arc having the same radius as the circular arc of the outer peripheral surface of the concave portion corresponding to the protrusion is located closer to the end surface on the shoulder belt side than the position of a center of the imaginary circular arc in the circumferential direction corresponding to a base of the protrusion.

Still furthermore, the tongue according to the present invention is characterized in that the seat belt sliding surface includes at least a shoulder belt side seat belt sliding surface extending in the length direction of the seat belt insertion hole and disposed on the shoulder belt side, the shoulder belt side seat belt sliding surface extends from a shoulder belt side of a position at which a distance in a direction perpendicular or substantially perpendicular to the length direction of the seat belt insertion hole is minimized to a lap belt side of the position, and a portion of the shoulder belt side seat belt sliding surface is located on the lap belt side of the position at which the distance is minimized.

Still furthermore, the tongue according to the present invention is characterized in that the seat belt sliding surface includes a lap belt side seat belt sliding surface that extends along the length direction of the seat belt insertion hole and that is disposed on the lap belt side.

Still furthermore, the tongue of the present invention is characterized in that each of the concave portions is formed so as to have an arc-like outer peripheral surface in cross section in a direction perpendicular or substantially perpendicular to the length direction of the seat belt insertion hole.

Still furthermore, the tongue according to the present invention is characterized in that the seat belt sliding surface includes at least a first end seat belt sliding surface and a second end seat belt sliding surface disposed on either end of the seat belt insertion hole and extending in the length direction of the seat belt insertion hole.

Still furthermore, the tongue according to the present invention is characterized in that a plurality of the concave portions are provided, and the seat belt sliding surface includes an intermediate seat belt sliding surface that extends in a direction perpendicular or substantially perpendicular to the length direction of the seat belt insertion hole between every two neighboring ones of the plurality of concave portions.

Still furthermore, the tongue according to the present invention is characterized in that the top end of each of the protrusions is formed in a substantially spherical shape.

In addition, according to the present invention, a seat belt apparatus is characterized in that it includes a seat belt, a seat belt retractor configured to retract the seat belt, a tongue slidably supported by the seat belt, and a buckle that allows the tongue to be inserted thereinto and engaged therewith, an occupant wears the seat belt by inserting the tongue into the buckle and engaging the tongue with the buckle, and the tongue is defined as one of the above-described tongues of the present invention.

Advantageous Effects of Invention

According to the tongue of the present invention having such a structure, a predetermined number of the concave portions are provided in the seat belt sliding surface, and a predetermined number of the protrusions are provided in the concave portions. In this manner, since, at normal times, a tension force exerted on the seat belt is low, the seat belt is not in contact with the protrusions. Alternatively, even when the seat belt is in contact with any one of the protrusions, the seat belt is in low force contact with the protrusion. Accordingly, the seat belt actually slides on the seat belt sliding surface. Thus, at normal times, the seat belt can smoothly slide on the tongue. As a result, the operability of the seat belt can be effectively improved at normal times. In contrast, in the event of an emergency, the tension force exerted on the seat belt significantly increases. At that time, the seat belt enters the concave portions, and the protrusions bite into the seat belt. Accordingly, even when the seat belt attempts to stretch toward the lap belt, movement of the seat belt toward the lap belt can be effectively stopped due to the gripping forces (the frictional forces) of the protrusions against the seat belt. As a result, stretch of the lap belt occurring in the event of an emergency can be effectively prevented, and the occupant can be more effectively restrained by the lap belt.

In particular, each of the protrusions is formed in the concave portion so as not to protrude outwardly beyond the seat belt sliding surface. Accordingly, at normal times, the seat belt can more effectively smoothly slide on the tongue.

In addition, the cross section of each of the predetermined number of the protrusions in a direction perpendicular or substantially perpendicular to the seat belt insertion hole is formed in a triangular shape including a flat or substantially flat end surface on the shoulder belt side and a flat or substantially flat end surface on the lap belt side. Furthermore, an angle formed by the seat belt in slide contact with at least some of the protrusions and the end surface on the shoulder belt side is set to a relatively large value, and an angle formed by the seat belt and the end surface on the lap belt side is set to a relatively small value. Accordingly, when the seat belt is worn in the event of an emergency and if the seat belt in slide contact with at least some of the protrusions attempts to move toward the lap belt, the gripping force (the frictional force) of at least some of the protrusions can be relatively increased. Thus, stretch of the lap belt can be effectively prevented. In addition, when the seat belt is worn and if the seat belt in slide contact with at least some of the protrusions attempts to move toward the shoulder belt, the gripping force (the frictional force) of at least some of the protrusions can be relatively decreased. Thus, the seat belt can relatively smoothly move toward the shoulder belt. In addition, since the top end of each of the protrusion is formed as a circular arc having a predetermined radius of curvature (an R portion), the strength of the seat belt can be maintained so as to support a relatively large force exerted from the protrusions onto the seat belt in the event of an emergency.

Furthermore, the shoulder belt side seat belt sliding surface disposed along in the length direction of the seat belt insertion hole extends from a shoulder belt side of a position at which a distance in a direction perpendicular or substantially perpendicular to the length direction of the seat belt insertion hole is minimized to a lap belt side of the position, and a portion of the shoulder belt side seat belt sliding surface is located on the lap belt side of the position at which the distance is minimized. In this manner, even when the concave portions are provided in the seat belt sliding surface, the seat belt can be caused to pass through the smooth minimum width portion of the seat belt insertion hole where the concave portions are not located. Thus, turnover of the seat belt can be prevented, and the seat belt can be maintained untwisted. In this manner, at normal times, the seat belt can easily and smoothly slide on the tongue, and the operability of the seat belt can be more improved at normal times.

Still furthermore, by forming the cross section of the outer peripheral surface of the concave portion formed in the seat belt sliding surface in a direction perpendicular or substantially perpendicular to the length direction of the seat belt insertion hole in an arc shape, the seat belt can more effectively slide on the tongue at normal times. In addition, in the event of an emergency, the lap belt can more effectively restrain the occupant.

Still furthermore, the seat belt sliding surface includes the first and second end seat belt sliding surfaces at either end thereof in the length direction of the seat belt insertion hole. The first and second end seat belt sliding surfaces extend in a direction that is perpendicular or substantially perpendicular to the length direction of the seat belt insertion hole. In addition, a plurality of the concave portions are provided, and the seat belt sliding surface includes the intermediate seat belt sliding surface between the concave portions. The intermediate seat belt sliding surface extends in the direction that is perpendicular or substantially perpendicular to the length direction of the seat belt insertion hole. In this manner, at normal times, the seat belt can easily and smoothly slide on the tongue, and the operability of the seat belt at normal times can be more improved.

Still furthermore, by forming the top end of each of the protrusions in a spherical shape, the strength of the seat belt can be set so as to support a relatively large force exerted from the protrusions onto the seat belt in the event of an emergency.

In addition, according to the seat belt apparatus using the tongue of the present invention, the tongue can easily and smoothly slide on the seat belt at normal times, and stretch of the lap belt can be effectively prevented in the event of an emergency. Furthermore, the strength of the seat belt can be maintained so as to support a force exerted from the protrusion onto the seat belt in the event of an emergency. Accordingly, the ease of wear of the seat belt for the occupant and the restraint of the occupant by the seat belt can be more improved.

BRIEF DESCRIPTION OF DRAWINGS

FIG. 3(A) is a front view of the tongue of the example illustrated in FIG. 2; and FIG. 3(B) is a cross-sectional view taken along a line IIIB-IIIB of FIG. 3(A).

FIG. 4(A) is a front view of a seat belt sliding unit of the tongue in the example illustrated in FIG. 2; and FIG. 4(B) is a bottom view of the seat belt sliding unit in FIG. 4(A).

FIG. 7(A) is a front view of another example of a tongue according to the embodiment of the present invention; FIG. 7(B) is a cross-sectional view taken along a line VIIB-VIIB of FIG. 7(A); and FIG. 7(C) is a back view of the tongue illustrated in FIG. 7(A).

FIG. 8(A) is a front view of a seat belt sliding unit of the example of the tongue illustrated in FIG. 7(A); and FIG. 8(B) is a bottom view of the seat belt sliding unit illustrated in FIG. 8(A).

DESCRIPTION OF EMBODIMENTS

Figure 1:
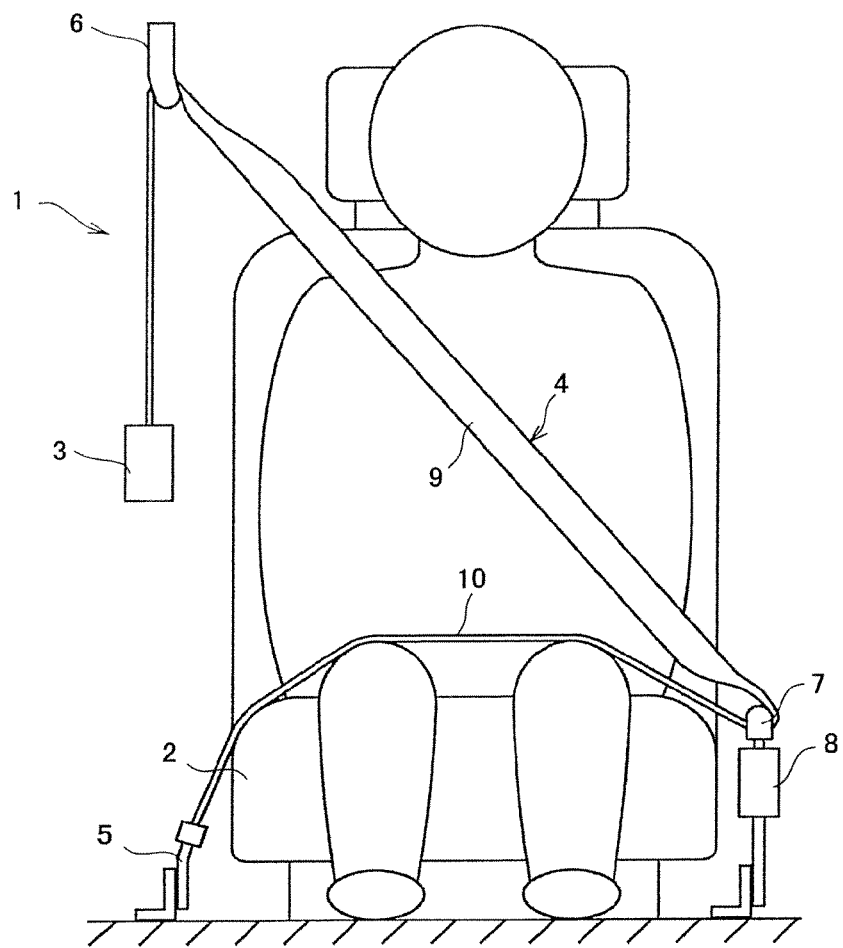
FIG. 1 is a schematic illustration of a seat belt apparatus according to an embodiment of the present invention.

Embodiments of the present invention are described below with reference to the accompanying drawings. FIG. 1 is a schematic illustration of a seat belt apparatus according to an embodiment of the present invention.

As illustrated in FIG. 1, according to the present embodiment, the seat belt apparatus has a basic structure the same as that of well-known existing three-point seat belt apparatuses. In the drawing, a reference numeral "1" designates the seat belt apparatus, a reference numeral "2" designates a vehicle seat, a reference numeral "3" designates a seat belt retractor disposed on the body structure of the vehicle in the vicinity of the vehicle seat 2, a reference numeral "4" designates a seat belt 4 withdrawably retracted by the seat belt retractor 3 and having a belt anchor 5 at the top thereof to be secured to the floor of the body structure of the vehicle or the vehicle seat 2, a reference numeral "6" designates a belt guide anchor 6 that leads the seat belt 4 withdrawn from the seat belt retractor 3 toward the shoulder of an occupant, a reference numeral "7" designates a tongue slidably supported by the seat belt 4 led from the belt guide anchor 6, and a reference numeral "8" designates a buckle that is secured to the floor of the body structure of the vehicle or the vehicle seat 2 and that allows the tongue 7 to be engageably/disengageably inserted thereinto. Fastening and unfastening operations of the seat belt 4 of the seat belt apparatus 1 are the same as those of existing the seat belt apparatuses.

When the seat belt 3 is not in use, the tongue 7 is not engaged with the buckle 8, and the entire length of the seat belt 4 (more specifically, the length of the seat belt 4 that the seat belt retractor 3 can retract without any problem) is retracted by the seat belt retractor 3. In contrast, when an occupant wears the seat belt 4, the seat belt 4 is withdrawn from the seat belt retractor 3 by a predetermined length, as illustrated in FIG. 1. Thereafter, the tongue 7 is engaged with the buckle 8, and slack in the seat belt 4 is removed. In this manner, the seat belt 4 is worn by the occupant.

When the seat belt 4 is worn by the occupant at normal times at which time deceleration that is much greater than that during usual travelling of the vehicle is not applied to the vehicle, the seat belt 4 is freely retractable at a normal belt retraction speed. In addition, if the occupant loses hold of the seat belt 4, the extra retracted length of the seat belt 4 is retracted by the seat belt retractor 3. In such a case, a portion of the seat belt 4 located between the belt guide anchor 6 and the tongue 7 functions as a shoulder belt 9 that restrains the shoulder and chest of the occupant, and a portion of the seat belt 4 located between the belt anchor 5 and the tongue 7 functions as a lap belt 10 that restrains the waist and legs of the occupant.

When the seat belt 4 is worn in the event of an emergency, the seat belt retractor 3 locks withdrawal of the seat belt 4. Thus, the seat belt 4 restrains the occupant. Note that like widely used seat belt retractors, even when the seat belt 4 of this example is withdrawn at a belt withdrawal speed that is much higher than a normal belt withdrawal speed, the seat belt retractor 3 of this example locks withdrawal of the seat belt 4. In addition, the seat belt retractor 3 may include a pretensioner and an energy absorption (EA) mechanism (neither is shown). Alternatively, the need for the pretensioner and the EA mechanism may be eliminated.

Figure 2:
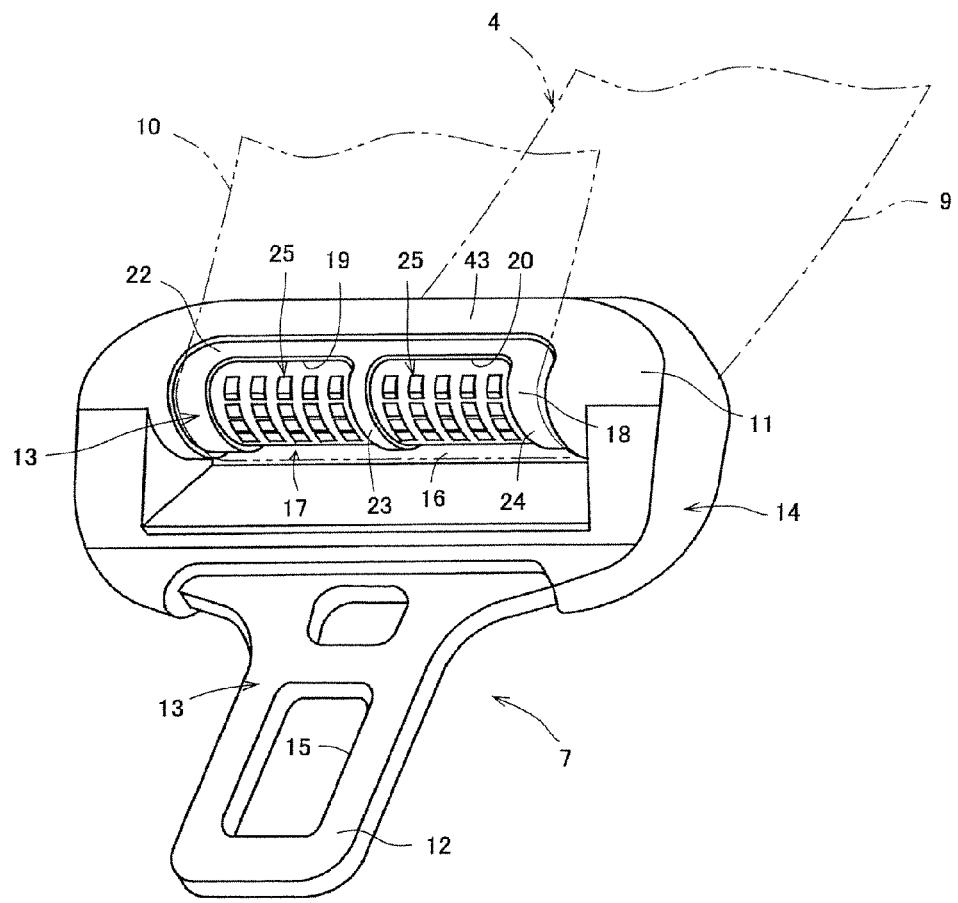
FIG. 2 is a perspective view of an example of a tongue used in the example of the seat belt apparatus according to the embodiment of the present invention.

FIG. 2 is a perspective view of a tongue used in the seat belt apparatus of this example according to an embodiment of the present invention. FIG. 3(A) is a front view of the tongue of the example illustrated in FIG. 2. FIG. 3(B) is a cross-sectional view taken along a line IIIB-IIIB of FIG. 3(A).

As illustrated in FIG. 2 and FIGS. 3(A) and 3(B), the tongue 7 of this example includes a gripper 11 used by the occupant to engage the tongue 7 with the buckle 8 and an engagement unit 12 to be engaged with the buckle 8. In addition, the tongue 7 includes a T-shaped metal plate 13. Part of the metal plate 13 forms the engagement unit 12, and the remaining part of the metal plate 13 corresponds to the gripper 11. In addition, part of the metal plate 13 corresponding to the gripper 11 is a resin mold unit 14 covered by a resin. The engagement unit 12 of the metal plate 13 has a rectangular engagement hole 15 formed therein. The engagement hole 15 is engageable with the buckle 8.

In addition, the gripper 11 has a seat belt insertion hole 16 formed therein. The seat belt insertion hole 16 allows the seat belt 4 to be inserted thereinto. The seat belt insertion hole 16 is formed so as have a slit shape extending in a direction perpendicular or substantially perpendicular to the engagement unit 12. In this case, a side edge 16a of the seat belt insertion hole 16 that extends in the length direction of the seat belt insertion hole 16 and that is adjacent to the engagement unit 12 is formed of resin. In contrast, a side edge 16b of the seat belt insertion hole 16 that extends in the length direction of the seat belt insertion hole 16 and that is remote from the engagement unit 12 is partially formed of resin. The remaining part of the side edge 16b is formed from the metal plate 13. The metal plate 13 that forms the side edge 16b of the seat belt insertion hole 16 functions as a seat belt sliding unit 17 on which the seat belt 4 slides.

As illustrated in FIGS. 4(A) and 4(B), the seat belt sliding unit 17 has a seat belt sliding surface 18. The seat belt sliding surface 18 is formed so as to be a smooth curved surface having a substantially semicircular (arc-like) shape in cross section in a direction perpendicular to the length direction of the seat belt insertion hole 16. In addition, the seat belt sliding surface 18 of the seat belt sliding unit 17 has a first concave portion 19 and a second concave portion 20 formed therein. The first and second concave portions 19 and 20 have the same size and shape. An outer peripheral surface 21 of the first and second concave portions 19 and 20 (the bottom surface of each of the concave portions) is also formed so as to have a substantially semicircular (arc-like) shape in cross section in a direction perpendicular to the length direction of the seat belt insertion hole 16. The semicircular shape has the same center as the semicircular shape of the seat belt sliding surface 18 of the seat belt sliding unit 17. That is, each of the first and second concave portions 19 and 20 is formed so as to have an arc-like cross section in a direction perpendicular or substantially perpendicular to the seat belt insertion hole 16 and have a rectangular shape in the direction of the seat belt insertion hole 16. In addition, the first and second concave portions 19 and 20 are arranged in the direction of the seat belt insertion hole 16. Note that the first and second concave portions 19 and 20 may be formed so as to have the sizes and shapes that differ from each other.

By using the first and second concave portions 19 and 20, the seat belt sliding surface 18 includes a shoulder belt side seat belt sliding surface 42 that extends in the length direction of the seat belt insertion hole 16 (the right-left direction in FIGS. 4(A) and 4(B)) and that is disposed on the "shoulder belt 9" side, a lap belt side seat belt sliding surface 43 that extends in the length direction of the seat belt insertion hole 16 and that is disposed on the "lap belt 10" side, an intermediate seat belt sliding surface 23 that extends in the direction perpendicular to the length direction of the seat belt insertion hole 16 between the first and second concave portions 19 and 20 and between the shoulder belt side seat belt sliding surface 42 and the lap belt side seat belt sliding surface 43, a first end seat belt sliding surface 22 that extends in the direction perpendicular to the length direction of the seat belt insertion hole 16 between the shoulder belt side seat belt sliding surface 42 and the lap belt side seat belt sliding surface 43 on the opposite side of the first concave portion 19 from the intermediate seat belt sliding surface 23 and a second end seat belt sliding surface 24 that extends in the direction perpendicular to the length direction of the seat belt insertion hole 16 between the shoulder belt side seat belt sliding surface 42 and the lap belt side seat belt sliding surface 43 on the opposite side of the second concave portion 20 from the intermediate seat belt sliding surface 23.

Each of the first and second concave portions 19 and 20 has a predetermined number of protrusions 25 formed thereon.

The protrusions 25 are independently disposed in a dotted pattern. In this example, the protrusions 25 are arranged in 4 rows of 5 columns. The 4 rows are arranged in a first direction that is perpendicular or substantially perpendicular to the length direction of the seat belt insertion hole 16 (the up-down direction in FIG. 4(B)), and the 5 columns are disposed in a second direction that is the length direction of the seat belt insertion hole 16 (the right-left direction in FIG. 4(B)). In such a case, first protrusions 25a of the protrusions 25 of the first concave portion 19 in the first low extending in the second direction (the row located closest to the lap belt 10) and first protrusions 25a of the protrusions of the second concave portion 20 in the first row in the second direction (the row located closest to the lap belt 10) are arranged in the same straight line or in substantially the same straight line. In addition, all of the first protrusions 25a in the first and second concave portions 19 and 20 are formed so as to have the same size and shape or substantially the same size and shape. Furthermore, second protrusions 25b of the protrusions 25 of the first concave portion 19 in the second row that neighbors the first row and that extends in the second direction and second protrusions 25b of the protrusions 25 of the second concave portion 20 in the second row extending in the second direction are arranged in the same straight line or in substantially the same straight line. In addition, all of the second protrusions 25b in the first and second concave portions 19 and 20 are formed so as to have the same size and shape or substantially the same size and shape. Still furthermore, third protrusions 25c of the protrusions 25 of the first concave portion 19 in the third row that neighbors the second row and that extends in the second direction and third protrusions 25c of the protrusions 25 of the second concave portion 20 in the third row that extends in the second direction are arranged in the same straight line or in substantially the same straight line. In addition, all of the third protrusions 25c in the first and second concave portions 19 and 20 are formed so as to have the same size and shape or substantially the same size and shape. Yet still furthermore, fourth protrusions 25d of the protrusions 25 of the first concave portion 19 in the fourth row that neighbors the third row and that extends in the second direction and fourth protrusions 25d of the protrusions 25 of the second concave portion 20 in the fourth row extending in the second direction are arranged in the same straight line or in substantially the same straight line. In addition, all of the fourth protrusions 25d in the first and second concave portions 19 and 20 are formed so as to have the same size and shape or substantially the same size and shape. Note that the number of arranged rows and columns of the protrusions 25 in the first and second directions is not limited to that illustrated in the drawings. Any number of arranged rows and columns can be set.

Figure 5:
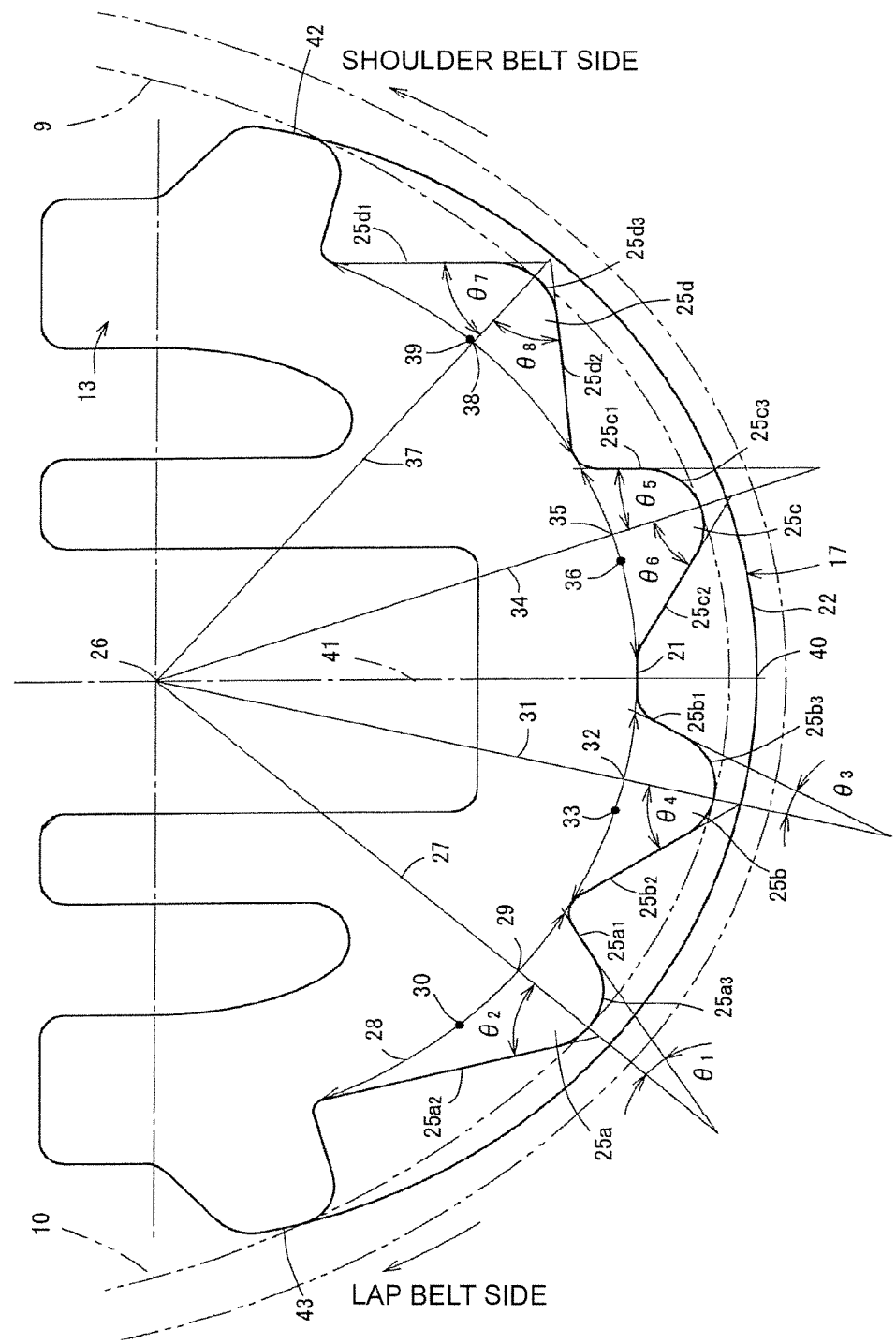
FIG. 5 is a cross-sectional view taken along V-V of FIG. 4(A).

As illustrated in FIG. 5, each of the first to fourth protrusions 25a, 25b, 25c, and 25d disposed in the same row in the first direction is formed so as to have a triangular or substantially triangular cross section in the first direction.

In such a case, each of the first protrusions 25a has an end surface $25a_1$ on the "shoulder belt 9" side and an end surface $25a_2$ on the "lap belt 10" side. Each of the end surfaces $25a_1$ and $25a_2$ is formed so as to be a flat or substantially flat surface. The imaginary extension planes of the end surfaces $25a_1$ and $25a_2$ can intersect with each other. In addition, a top end $25a_3$ of the first protrusion 25a, which corresponds to an intersecting portion of the end surface $25a_1$ and the end surface $25a_2$, is an arc portion (an R portion) having a predetermined radius of curvature. Note that the base of the first protrusions 25a is also an arc portion (an R portion) having a predetermined radius of curvature.

As indicated by an alternate long and two short dashes line in FIG. 5, the seat belt 4 is in slide contact with at least part of regions of the end surfaces $25a_1$ and $25a_2$ including the top end $25a_3$. An angle $\theta_1$ (an acute angle) formed by an imaginary line (a normal line) 27 between an arc center 26 of the outer peripheral surface 21 of the first and second concave portions 19 and 20 and the top end $25a_3$ (more precisely, the topmost end) and the end surface $25a_1$ is less than an angle $\theta_2$ (an acute angle) formed by the imaginary line 27 and the end surface $25a_2$ ($\theta_1<\theta_2$). That is, an intersection point 29 between an imaginary circle 28 having the same center and radius as the circle of the arc formed by the outer peripheral surface 21 and the imaginary line 27 is located closer to the end surface $25a_1$ on the "shoulder belt 9" side than a center 30 of the arc of the base of the first protrusion 25a in the circumferential direction (i.e., a center 30 of an imaginary arc of the imaginary circle 28 between the intersecting portion between the imaginary arc 28 and the end surface $25a_1$ and the intersecting portion between the imaginary arc 28 and the end surface $25a_2$).

By forming each of the first protrusions 25a in this manner, an angle formed by the end surface $25a_1$ and the seat belt 4 that is in slide contact with the first protrusion 25a is relatively large, and an angle formed by the end surface $25a_2$ and the seat belt 4 is relatively small. Accordingly, when the seat belt 4 is worn in the event of an emergency and if the seat belt 4 in contact with the first protrusions 25a attempts to stretch toward the lap belt 10, the seat belt 4 is effectively caught by a portion of the top end $25a_3$ of the first protrusion 25a on the "shoulder belt 9" side and a portion of the end surface $25a_1$ that continuously extends from the top end $25a_3$. In this manner, a gripping force of the first protrusions 25a against the seat belt 4 (friction between the first protrusion 25a and the seat belt 4) is made relatively large and, thus, movement of the seat belt 4 toward the lap belt 10 is effectively prevented. That is, stretch of the lap belt 10 can be effectively prevented. In addition, when the seat belt is worn and if the seat belt 4 in contact with the first protrusion 25a attempts to move toward the shoulder belt 9, the seat belt 4 is negligibly caught by the first protrusions 25a. Thus, the gripping force of the first protrusions 25a against the seat belt 4 (the friction) is made relatively small. Therefore, the seat belt 4 relatively smoothly moves toward the shoulder belt 9. Furthermore, since the top end $25a_3$ of the first protrusion 25a serves as an R portion having a predetermined radius of curvature, the seat belt 4 maintains the strength capable of supporting a relatively large force exerted from the first protrusions 25a onto the seat belt 4 in the event of an emergency.

In addition, each of the second and third protrusions 25b and 25c is formed so as to have a shape the same as that of the first protrusion 25a. That is, each of the second protrusions 25b has an end surface $25b_1$ on the "shoulder belt 9" side and an end surface $25b_2$ on the "lap belt 10" side. Each of the end surfaces $25b_1$ and $25b_2$ is formed so as to be a flat or substantially flat surface. In addition, a top end $25b_3$ of the second protrusion 25b is an arc portion (an R portion) having a predetermined radius of curvature. Similarly, each of the third protrusions 25c has an end surface $25c_1$ on the "shoulder belt 9" side and an end surface $25c_2$ on the "lap belt 10" side. Each of the end surfaces $25c_1$ and $25c_2$ is formed so as to be a flat or substantially flat surface. In addition, a top end $25c_3$ of the third protrusion 25c is an arc portion (an R portion) having a predetermined radius of curvature.

Furthermore, an angle $\theta_3$ (an acute angle) formed by an imaginary line (a normal line) 31 of the second protrusion 25b and the end surface $25b_1$ is less than an angle $\theta_4$ (an acute angle) formed by the imaginary line 31 and the end surface $25b_2$ ($\theta_3<\theta_4$). That is, an intersection point 32 between an imaginary circle 28 and the imaginary line 31 is located closer to the end surface $25b_1$ on the "shoulder belt 9" side than a center 33 of the arc of the base of the second protrusion 25b in the circumferential direction (the arc similar to the arc of the base of the above-described first protrusion 25a). Similarly, an angle $\theta_5$ (an acute angle) formed by an imaginary line (a normal line) 34 of the third protrusions 25c and the end surface $25c_1$ is less than an angle $\theta_6$ (an acute angle) formed by the imaginary line 34 and the end surface $25c_2$ ($\theta_5<\theta_6$). That is, an intersection point 35 between the imaginary circle 28 and the imaginary line 34 is located closer to the end surface $25c_1$ on the "shoulder belt 9" side than a center 36 of the arc of the base of the third protrusion 25c in the circumferential direction (the arc similar to the arc of the base of the above-described first protrusion 25a). In addition, in the tongue 7 of this example, the angles $\theta_1$, $\theta_3$, and $\theta_5$ are constant or substantially constant (i.e., the same or substantially the same) ($\theta_1=\theta_3=\theta_5$ or $\theta_1 \cong \theta_3 \cong \theta_5$). In this manner, in the event of an emergency, the gripping forces of the first to third protrusions 25a, 25b, and 25c against the seat belt 4 are substantially constant. It should be noted that the present invention is not limited to the value of the angles $\theta_1$, $\theta_3$, and $\theta_5$. For example, the angles $\theta_1$, $\theta_3$, and $\theta_5$ may be set to different values, or some of the angles $\theta_1$, $\theta_3$, and $\theta_5$ may be set to different values.

Like the first protrusions 25a, by forming the second protrusions 25b and the third protrusions 25c in this manner, the gripping forces of the second protrusions 25b and the third protrusions 25c against the seat belt 4 that attempts to move toward the lap belt 10 can be increased. In addition, the seat belt 4 can relatively smoothly move toward the shoulder belt 9. Furthermore, the strength of the seat belt 4 can be maintained.

In addition, each of the first to fourth protrusions 25a, 25b, 25c, and 25d is disposed in the first and second concave portions 19 and 20 so that the top end $25a_3$ thereof does not protrude beyond the seat belt sliding surface 18.

By forming the first to fourth protrusions 25a, 25b, 25c, and 25d in this manner, the seat belt 4 is not in contact with the first to fourth protrusions 25a, 25b, 25c, and 25d, since the tension force exerted on the seat belt 4 at normal times is small. Alternatively, even when the seat belt 4 is in contact with any one of the first to fourth protrusions 25a, 25b, 25c, and 25d, the seat belt 4 is in low force contact with the protrusion. Therefore, the seat belt 4 actually slides on the seat belt sliding surface 18. Thus, at normal times, the seat belt 4 smoothly slides on the tongue 7.

In contrast, in the event of an emergency, the tension force exerted on the seat belt 4 significantly increases. At that time, the seat belt 4 enters the first and second concave portions 19 and 20, and at least one of the first to fourth protrusions 25a, 25b, 25c, and 25d bites into the seat belt 4. Accordingly, even when the seat belt 4 attempts to stretch toward the lap belt, movement of the seat belt 4 toward the lap belt can be stopped due to the gripping forces (the frictional force) of the first to fourth protrusions 25a, 25b, 25c, and 25d that bite into the seat belt 4 against the seat belt 4.

Note that in the tongue 7 of this example, the shape of the fourth protrusion 25d differs from the shape of any one of the first to third protrusions 25a, 25b, and 25c. That is, a relationship between an angle $\theta_7$ (an acute angle) formed by an imaginary line (a normal line) 37 of the fourth protrusion 25d and an end surface $25d_2$ and an angle $\theta_8$ (an acute angle) formed by the imaginary line 37 and an end surface $25d_3$ differs from in each of the first to third protrusions 25a, 25b, and 25c. In addition, a relationship between the position of an intersection point 38 between an imaginary arc 28 and the normal line 37 and the position of a center 39 of an arc of the base of the fourth protrusion 25$d$ (similar to the above-described arc of the base of the first protrusion 25$a$) in the circumferential direction differs from in each of the first to third protrusions 25$a$, 25$b$, and 25$c$.

In addition, in the tongue 7 of this example, each of the end surface 25$c_1$ of the third protrusions 25$c$ and an end surface 25$d_1$ of the fourth protrusions 25$d$ located closer to the shoulder belt 9 than a center 40 of the seat belt sliding unit 17 in the first direction is parallel or substantially parallel to a line 41 between the center 26 and the center 40. In contrast, each of the end surface 25$a_1$ of the first protrusions 25$a$ and an end surface 25$b_1$ of the second protrusions 25$b$ located closer to the lap belt 10 than the center 40 of the seat belt sliding unit 17 in the first direction is inclined from the line 41 between the center 26 and the center 40.

According to the tongue 7 of this example, each of the first to fourth protrusions 25$a$, 25$b$, 25$c$, and 25$d$ is formed in each of the first and second concave portions 19 and 20 of the seat belt sliding surface 18 so that the top end 25$a_3$ thereof is located within the first and second concave portions 19 and 20 and does not protrude beyond the seat belt sliding surface 18. In this manner, at normal times at which time the tension force exerted on the seat belt 4 is relatively small, the seat belt 4 actually slides on the seat belt sliding surface 18, as described above. Accordingly, at normal times, the seat belt 4 can more effectively smoothly slide on the tongue 7. As a result, the operability of the seat belt 4 at normal times can be effectively improved.

In contrast, in the event of an emergency, the tension force exerted on the seat belt 4 is significantly large. Accordingly, at that time, the seat belt 4 enters the first and second concave portions 19 and 20 and, thus, at least one of the first to fourth protrusions 25$a$, 25$b$, 25$c$, and 25$d$ bite into the seat belt 4. Consequently, when the seat belt 4 attempts to stretch toward the lap belt, the gripping force (the frictional force) of the first to fourth protrusions 25$a$, 25$b$, 25$c$, and 25$d$ that bite into the seat belt 4 against the seat belt 4 can effectively prevent the seat belt 4 from moving toward the lap belt. As a result, in the event of an emergency, the stretch of the lap belt 10 can be effectively reduced and, thus, the occupant can be more effectively restrained by the lap belt 10.

In particular, by forming the cross section of the outer peripheral surface of the first and second concave portions 19 and 20 formed in the seat belt sliding surface 18 in a direction perpendicular or substantially perpendicular to the length direction of the seat belt insertion hole 16 in an arc shape, the seat belt 4 can more effectively slide on the tongue 7 at normal times. In addition, in the event of an emergency, the lap belt 10 can more effectively restrain the occupant.

In addition, a predetermined number of the protrusions 25 are provided on the seat belt sliding unit 17 of the metal plate 13. Furthermore, among the protrusions 25, the angles $\theta_1$, $\theta_3$, and $\theta_5$ (acute angles) formed by the imaginary lines (the normal lines) 27, 31, and 34 drawn from the topmost ends of the first to third protrusion 25$a$, 25$b$, and 25$c$ to the arc center 26 of the outer peripheral surface 21 of in which the first to third protrusions 25$a$, 25$b$, and 25$c$ are formed and the end surfaces 25$a_1$, 25$b_1$, and 25$c_1$ of the first to third protrusions 25$a$, 25$b$, and 25$c$ on the "shoulder belt 9" side are less than the angles $\theta_2$, $\theta_4$, and $\theta_6$ (acute angles) formed by the imaginary lines (the normal lines) 27, 31, and 34 and the end surfaces 25$a_2$, 25$b_2$, and 25$c_2$ of the first to third protrusions 25$a$, 25$b$, and 25$c$ on the "lap belt 10" side, respectively (i.e., $\theta_1 < \theta_2$, $\theta_3 < \theta_4$, and $\theta_5 < \theta_6$). In this manner, the angles formed by the end surfaces 25$a_1$, 25$b_1$, and 25$c_1$ on the "shoulder belt 9" side and the seat belt 4 that is in slide contact with the first to third protrusions 25$a$, 25$b$, and 25$c$ can be made relatively large. In addition, the angles formed by the end surfaces 25$a_2$, 25$b_2$, and 25$c_2$ on the "lap belt 10" side and the seat belt 4 can be made relatively small. Accordingly, when the seat belt is worn in the event of an emergency and if the seat belt 4 that is in contact with the first to third protrusions 25$a$, 25$b$, and 25$c$ attempts to move toward the lap belt 10, the gripping force of the first to third protrusions 25$a$, 25$b$, and 25$c$ against the seat belt 4 can be relatively significantly increased and, thus, the movement of the seat belt 4 toward the lap belt 10 can be effectively prevented. That is, stretch of the lap belt 10 can be effectively prevented. In addition, when the seat belt is worn and if the seat belt 4 that is in contact with the first to third protrusions 25$a$, 25$b$, and 25$c$ attempts to move toward the shoulder belt 9, the gripping force of the first to third protrusions 25$a$, 25$b$, and 25$c$ against the seat belt 4 can be relatively significantly decreased. Thus, the seat belt 4 can be smoothly moved toward the shoulder belt 9. Furthermore, since each of the top ends 25$a_3$, 25$b_3$, 25$c_3$, and 25$d_3$ of the first to fourth protrusions 25$a$, 25$b$, 25$c$, and 25$d$, respectively, is formed as an R portion having a predetermined radius of curvature, the strength of the seat belt 4 can be maintained so as to support a relatively strong force applied from the first to fourth protrusions 25$a$, 25$b$, 25$c$, and 25$d$ to the seat belt 4 in the event of an emergency.

Furthermore, in addition to the first and second end seat belt sliding surfaces 22 and 24 located at either end of the seat belt insertion hole 16 in the length direction of the seat belt insertion hole 16, the intermediate seat belt sliding surface 23 is provided between the first and second concave portions 19 and 20 as the seat belt sliding surface 18. Accordingly, the strength of the seat belt 4 can be more effectively maintained against the force exerted on the seat belt 4 in the event of an emergency.

A particular example of the protrusion 25 of the tongue 7 that can be widely used for a vehicle, such as a motor vehicle, and that can provide the above-described operation and effect is described next. The width of the protrusion 25 (the length in the length direction of the seat belt insertion hole 16) is set to 0.5 mm to 2 mm (most preferably 1.0 mm). The interval between the neighboring protrusions 25 in the length direction of the seat belt insertion hole 16 is set to 1 mm to 3 mm (most preferably 2.0 mm). The radius of the R portion at the top end of the protrusion 25 is set to 0.5 mm to 1.5 mm (most preferably 0.8 mm). Note that it is desirable that the edges of the protrusion on both sides in a direction perpendicular to the length direction of the seat belt insertion hole 16 be also formed as an R portion. The radius of the R portion of the side edges is set to 0.2 mm to 1 mm (most preferably 0.5 mm).

In addition, according to the seat belt apparatus 1 using the tongue 7 of this example, the tongue 7 can smoothly slide on the seat belt 4 at normal times, and stretch of the lap belt 10 can be effectively prevented in the event of an emergency. In addition, the strength of the seat belt 4 can be maintained so as to support a force exerted from the protrusions 25 onto the seat belt 4 in the event of an emergency. Accordingly, the ease of wear of the seat belt 4 for the occupant and the restraint of the occupant by the seat belt 4 can be more improved.

Figure 6:
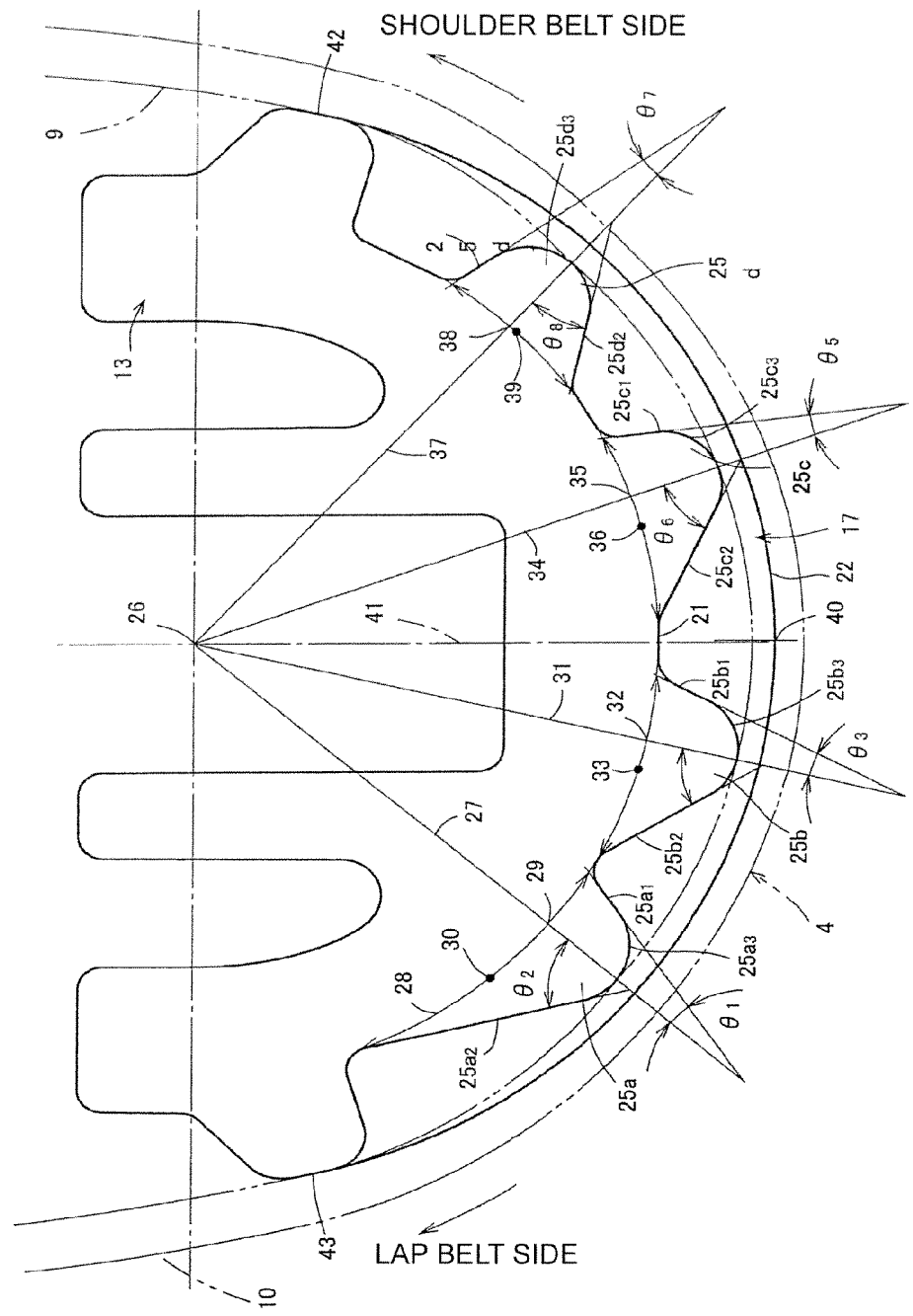
FIG. 6 is a cross-sectional view of another example of the tongue according to the embodiment of the present invention, which corresponds to FIG. 5.

FIG. 6 is a cross-sectional view of a tongue according to another embodiment of the present invention, which corresponds to FIG. 5. In the above-described example illustrated in FIG. 5, the shape of the fourth protrusion 25$d$ is formed so as to differ from the shape of each of the first to third protrusions 25$a$, 25$b$, and 25$c$. In contrast, as illustrated in FIG. 6, in the tongue 7 of this example, the shape of the fourth protrusion 25$d$ is formed so as to be the same as the shapes of the first to third protrusions 25a, 25b, and 25c. That is, the fourth protrusion 25d includes an end surface $25d_1$ on the "shoulder belt 9" side and an end surface $25d_2$ on the "lap belt 10" side. Each of the end surfaces $25d_1$ and $25d_2$ is formed so as to be a flat or substantially flat surface. In addition, a top end $25d_3$ of the fourth protrusions 25d is formed as an arc portion (an R portion) having a predetermined radius.

Furthermore, an angle $\theta_7$ (an acute angle) formed by an imaginary line (a normal line) 37 and the end surface $25d_1$ of the fourth protrusions 25d is less than an angle $\theta_8$ (an acute angle) formed by the imaginary line 37 and the end surface $25d_2$ ($\theta_7 < \theta_8$). That is, an intersection point 38 between the imaginary circle 28 and the imaginary line 37 is located closer to the end surface $25d_1$ on the "shoulder belt 9" side than the center 39 of the arc of the base of the fourth protrusion 25d in the circumferential direction (similar to the above-described arc of the base of the first protrusion 25a). Similarly, in the tongue 7 of this example, the angles $\theta_1$, $\theta_3$, $\theta_5$, and $\theta_7$ are constant, namely, the same or substantially the same ($\theta_1 = \theta_3 = \theta_5 = \theta_7$ or $\theta_1 \cong \theta_3 \cong \theta_5 \cong \theta_7$). In this manner, the gripping forces of the first to fourth protrusions 25a, 25b, 25c, and 25d against the seat belt 4 in the event of an emergency can be substantially the same. It should be noted that the angles are not limited thereto. The angles $\theta_1$, $\theta_3$, $\theta_5$, and $\theta_7$ can be set so as to differ from one another, or some of the angles $\theta_1$, $\theta_3$, $\theta_5$, and $\theta_7$ can be set to different values.

In addition, in the above-described example, the end surfaces $25c_1$ and $25d_1$ of the third and fourth protrusions 25c and 25d on the "shoulder belt 9" side are parallel or substantially parallel to the line 41. In contrast, in the tongue 7 of this example, the end surfaces $25c_1$ and $25d_1$ are disposed so as to be inclined from the line 41 between the center 26 and the center 40. In this manner, the gripping force of the third and fourth protrusions 25c and 25d against the seat belt 4 is relatively significantly increased in the event of an emergency. Accordingly, stretch of the lap belt 10 occurring in the event of an emergency can be effectively prevented while maintaining the strength of the seat belt 4. The operations and effects of the tongue 7 of this example and another configuration of the seat belt apparatus 1 using the tongue 7 are the same as those of the above-described example.

FIG. 7(A) is a front view of the tongue used in the seat belt apparatus of this example according to an embodiment of the present invention. FIG. 7(B) is a cross-sectional view taken along a line IIB-IIB of FIG. 7(A). FIG. 7(C) is a back view of the tongue illustrated in FIG. 7(A). FIG. 8(A) is a front view of a seat belt sliding unit of the tongue of the example illustrated in FIG. 7(A). FIG. 8(B) is a bottom view of the seat belt sliding unit illustrated in FIG. 8(A).

As illustrated in FIGS. 7(A) and 7(B) and FIGS. 8(A) and 8(B), the tongue 7 of this example has a predetermined number of protrusions 25 in 3 rows of 5 columns. The 5 columns are disposed in a first direction that is perpendicular or substantially perpendicular to the length direction of the seat belt insertion hole 16. In addition, the 3 rows are disposed in a second direction which is the length direction of the seat belt insertion hole 16.

Figure 9:
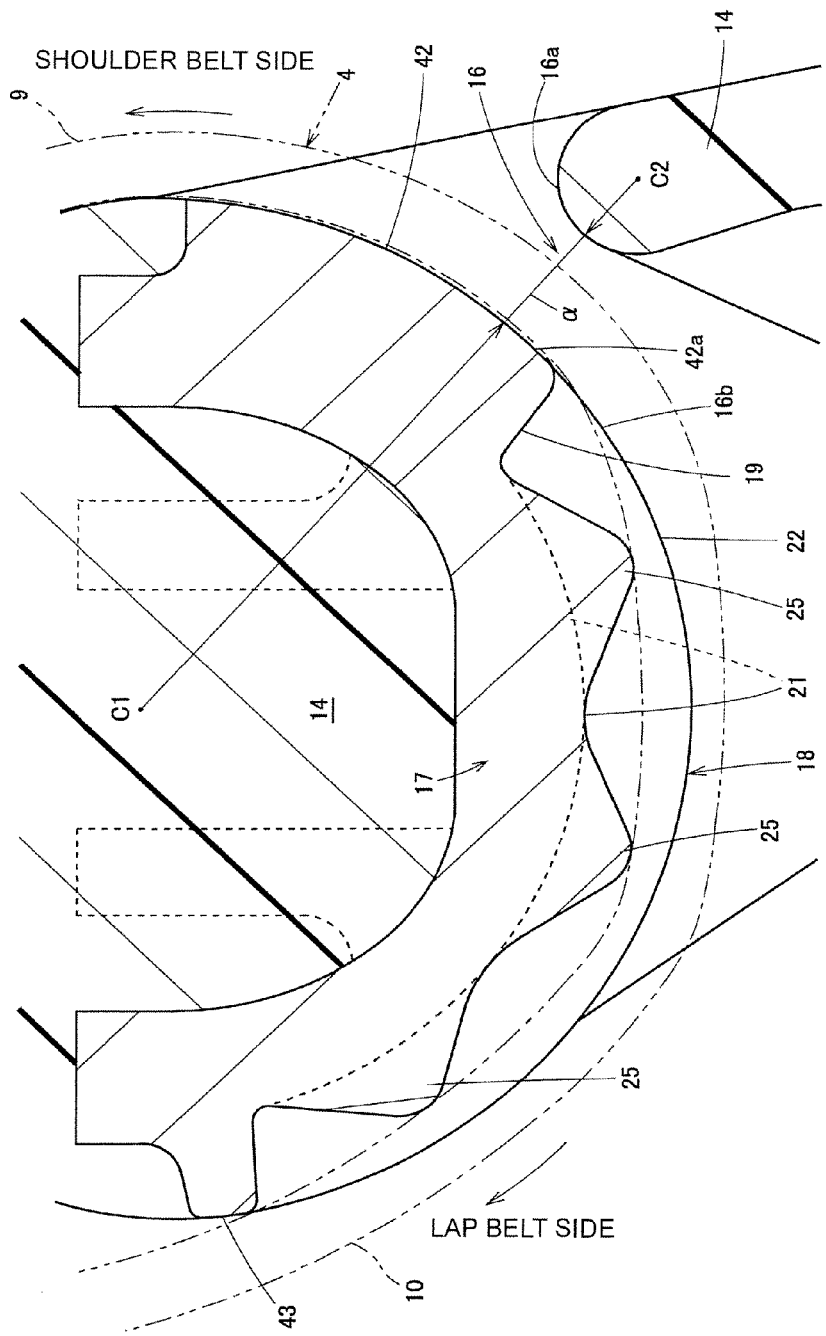
FIG. 9 is a partially enlarged cross-sectional view of a IX portion illustrated in FIG. 7(B).

As illustrated in FIG. 9, the protrusions 25 in the first and second concave portions 19 and 20 are formed so as have a conic shape or a substantially conic shape of the same or substantially the same size. In this case, the vertexes (the top ends) of the protrusions 25 are shaped to be spherical (a circular arc in cross section).

The width of the shoulder belt side seat belt sliding surface 42 (the length in a direction perpendicular to the length direction of the seat belt insertion hole 16) is much greater than the width of the lap belt side seat belt sliding surface 43 on the "lap belt 10" side. In addition, the shoulder belt side seat belt sliding surface 42 faces the side edge 16a of the seat belt insertion hole 16 on the "engagement unit 12" side. The side edge 16a is formed so as to have a smooth curved surface having a substantially semicircular arc shape in cross section in a direction perpendicular to the length direction of the seat belt insertion hole 16. Furthermore, let $\alpha$ be an imaginary line (a normal line) between an arc center C1 of the shoulder belt side seat belt sliding surface 42 (i.e., an arc center of the seat belt sliding surface 18) and an arc center C2 of the side edge 16a. Then, the shoulder belt side seat belt sliding surface 42 extends from the "shoulder belt 9" side of the imaginary line $\alpha$ to the "the lap belt 10" side of the imaginary line $\alpha$ across the imaginary line $\alpha$. That is, the shoulder belt side seat belt sliding surface 42 extends from the "shoulder belt 9" side of a position at which the distance between the shoulder belt side seat belt sliding surface 42 and the side edge 16a (i.e., the distance in a direction perpendicular or substantially perpendicular to the length direction of the seat belt insertion hole) is minimized to the "the lap belt 10" side of the position, and a portion 42a of the shoulder belt side seat belt sliding surface 42 is located on the "lap belt 10" side of the position at which the above-described distance is minimized.

Accordingly, the first and second concave portions 19 and 20 are not located in the minimum-width portion of the seat belt insertion hole 16 (the portion on the imaginary line $\alpha$ or the minimum-length portion in the direction perpendicular to the seat belt insertion hole 16). In the minimum-width portion of the seat belt insertion hole 16, the smooth curved shoulder belt side seat belt sliding surface 42 faces the smooth curved side edge 16a.

In the tongue 7 of this example having such a structure, when the seat belt 4 is not worn, the seat belt 4 is in contact with the smooth curved shoulder belt side seat belt sliding surface 42 on the "shoulder belt 9" side and the smooth curved side edge 16a with negligible pressure. In contrast, the seat belt 4 is in negligible contact with the bottom portion 21 of the first and second concave portions 19 and 20 and the protrusions 25. In this state, since the seat belt 4 passes through the minimum-width portion of the smooth seat belt insertion hole 16 at which the first and second concave portions 19 and 20 are not located, the seat belt 4 is negligibly turned over. Thus, the seat belt 4 is maintained untwisted.

In this state, in order to wear the seat belt 4, the occupant withdraws the seat belt 4 from the seat belt retractor 3, holds the gripper 11 of the tongue 7, and slides the tongue 7 on the seat belt 4. Thereafter, the occupant engages the tongue 7 with the buckle 8. In such a case, since the seat belt 4 is maintained untwisted, the tongue 7 smoothly slides on the seat belt 4. In addition, an excessively withdrawn portion of the seat belt 4 is retracted by the seat belt retractor 3, and the seat belt is worn by the occupant.

When the seat belt is worn, the seat belt 4 is subjected to light load due to a winding force of a return spring (not shown) of the seat belt retractor 3. At that time, the seat belt 4 is maintained untwisted, as described above. Accordingly, when the seat belt 4 is worn by the occupant and if the occupant moves by a predetermined length in order to perform some operation, the seat belt 4 relatively smoothly slides on the tongue 7. Accordingly, the occupant can smoothly move.

When the occupant wears the seat belt in the event of an emergency, the seat belt retractor 3 locks withdrawal of the seat belt 4 in a manner similar to that described above. At that time, since the seat belt 4 is subjected to a heavy load due to the force of inertia of the occupant, a high tension force is exerted on the seat belt 4. Accordingly, like the above-described example, as indicated by an alternate long and two short dashes line illustrated in FIG. 9, since the seat belt 4 enters the first and second concave portions 19 and 20, the protrusions 25 that face the seat belt 4 bite into the seat belt 4. In this manner, when the seat belt 4 attempts to stretch toward the lap belt 10, the gripping force (the frictional force) of the protrusions 25 against the seat belt 4 effectively prevents the seat belt 4 from moving toward the lap belt 10. That is, the stretch of the lap belt 10 is effectively prevented and, thus, the occupant can be effectively restrained by the lap belt 10 in the event of an emergency.

According to the tongue 7 of this example, the shoulder belt side seat belt sliding surface 42 disposed along the length direction of the seat belt insertion hole 16 extends from the "shoulder belt 9" side of a position at which the distance in a direction perpendicular or substantially perpendicular to the length direction of the seat belt insertion hole 16 is minimized to the "the lap belt 10" side of the position, and a portion of the shoulder belt side seat belt sliding surface 42 is located on the "lap belt 10" side of the position at which the above-described distance is minimized. Accordingly, even when the first and second concave portions 19 and 20 are provided in the seat belt sliding surface 18, the seat belt 4 can be caused to pass through the smooth minimum-width portion of the seat belt insertion hole 16 where the first and second concave portions 19 and 20 are not located. Thus, twisting of the seat belt 4 negligibly occurs, and the seat belt 4 can be maintained untwisted. In this manner, at normal times, the seat belt 4 can easily and smoothly slide on the tongue 7, and the operability of the seat belt 4 at normal times can be more improved.

In addition, the seat belt sliding surface 18 includes the first and second end seat belt sliding surfaces 22 and 24 at either end thereof in the length direction of the seat belt insertion hole 16. The first and second end seat belt sliding surfaces 22 and 24 extend in a direction that is perpendicular or substantially perpendicular to the length direction of the seat belt insertion hole 16. Furthermore, the seat belt sliding surface 18 includes the intermediate seat belt sliding surface 23 between the first and second concave portions 19 and 20. The seat belt sliding surface 18 extends in the direction that is perpendicular or substantially perpendicular to the length direction of the seat belt insertion hole 16. In this manner, at normal times, the seat belt 4 can easily and smoothly slide on the tongue 7, and the operability of the seat belt 4 can be more improved at normal times.

Still furthermore, by forming the top end of each of the protrusions 25 in a spherical shape, the strength of the seat belt 4 can be set so as to support a relatively large force exerted from the protrusions 25 onto the seat belt 4 in the event of an emergency. The other structures and the operation and effect of the tongue 7 of this example are the same as those of the above-described example. In addition, the other structures and the operation and effect of the seat belt apparatus 1 including the tongue 7 of this example are the same as those of the above-described example.

Note that while the above-described examples have been described with reference to the seat belt sliding surface 18 of the seat belt sliding unit 17 including two concave portions (i.e., the first and second concave portion 19 and 20), one or any greater number of concave portions may be provided. In addition, while the above-described examples have been described with reference to the resin mold unit 14, the need for the resin mold unit 14 may be eliminated from the tongue according to the present invention. That is, according to the tongue of the present invention, various design modification can be made within the scope of appended claims.

Industrial Applicability

According to the present invention, a tongue and a seat belt apparatus that are mounted in a vehicle, such as an automobile, and that restrain an occupant using a seat belt can be applied to tongues capable of being slidably supported by a seat belt and being engaged with a buckle and seat belt apparatuses including the tongue.

The invention claimed is:

1. A tongue slidably supported by a seat belt, the tongue partitioning the seat belt into a shoulder belt and a lap belt, the tongue capable of being engaged with a buckle, the tongue comprising:
   an elongate seat belt insertion hole configured to allow the seat belt to be inserted therethrough; and
   a seat belt sliding unit configured to form part of the seat belt insertion hole, the seat belt sliding unit including a seat belt sliding surface that allows the seat belt to slide thereon,
   wherein the seat belt sliding unit includes a predetermined number of concave portions in the seat belt sliding surface and a predetermined number of protrusions independently disposed in the concave portions;
   wherein each of the predetermined number of protrusions has a substantially triangular cross section in a direction that is perpendicular or substantially perpendicular to the seat belt insertion hole, and each of the protrusions includes a flat or substantially flat end surface located on the shoulder belt side and a flat or substantially flat end surface located on the lap belt side, and
   wherein for at least some of the predetermined number of protrusions, an acute angle formed by an imaginary line drawn from the topmost end of the protrusion to an arc center of an outer peripheral surface of the concave portion and the end surface of the protrusion on the shoulder belt side is less than an acute angle formed by the imaginary line and the end surface on the lap belt side, and the top end at which the end surface of the protrusion on the shoulder belt side intersects with the end surface on the lap belt side is formed in an arc shape.

2. The tongue according to claim 1, wherein each of the predetermined number of protrusions is provided in one of the concave portions so as not to protrude outwardly beyond the seat belt sliding surface.

3. The tongue according to claim 1, wherein the predetermined number of protrusions are independently disposed in the concave portions in a dotted pattern.

4. The tongue according to claim 3, wherein the seat belt sliding surface includes at least a shoulder belt side seat belt sliding surface extending in the length direction of the seat belt insertion hole and disposed on the shoulder belt side,
   wherein the shoulder belt side seat belt sliding surface extends from a shoulder belt side of a position at which a distance in a direction perpendicular or substantially perpendicular to the length direction of the seat belt insertion hole is minimized to a lap belt side of the position, and a portion of the shoulder belt side seat belt sliding surface is located on the lap belt side of the position at which the distance is minimized.

5. The tongue according to claim 4, wherein the seat belt sliding surface includes a lap belt side seat belt sliding surface that extends along the length direction of the seat belt insertion hole and that is disposed on the lap belt side.

6. The tongue according to claim 1, wherein each of the concave portions is formed so as to have an arc-like outer peripheral surface in cross section in a direction perpendicular or substantially perpendicular to the length direction of the seat belt insertion hole.

7. The tongue according to claim 1, wherein the seat belt sliding surface includes at least a first end seat belt sliding surface and a second end seat belt sliding surface disposed on either end of the seat belt insertion hole and extending in the length direction of the seat belt insertion hole.

8. The tongue according to claim 7, wherein a plurality of the concave portions are provided, and
wherein the seat belt sliding surface includes an intermediate seat belt sliding surface that extends in a direction perpendicular or substantially perpendicular to the length direction of the seat belt insertion hole between every two neighboring ones of the plurality of concave portions.

9. The tongue according to claim 1, wherein the top end of each of the protrusions is formed in a substantially spherical shape.

10. A seat belt apparatus comprising:
a seat belt;
a seat belt retractor configured to retract the seat belt;
a tongue slidably supported by the seat belt; and
a buckle that allows the tongue to be inserted thereinto and engaged therewith,
wherein an occupant wears the seat belt by inserting the tongue into the buckle and engaging the tongue with the buckle, and
wherein the tongue is defined as the tongue according to claim 1.

11. A tongue slidable supported by a seat belt, the tongue partitioning the seat belt into a shoulder belt and a lap belt, the tongue capable of being engaged with a buckle, the tongue comprising:
an elongate seat belt insertion hole configured to allow the seat belt to be inserted therethrough; and
a seat belt sliding unit configured to form part of the seat belt insertion hole, the seat belt sliding unit including a seat belt sliding surface that allows the seat belt to slide thereon,
wherein the seat belt sliding unit includes a predetermined number of concave portions in the seat belt sliding surface and a predetermined number of protrusions independently disposed in the concave portions;
wherein each of the predetermined number of protrusions has a substantially triangular cross section in a direction that is perpendicular or substantially perpendicular to the seat belt insertion hole, and each of the protrusions includes a flat or substantially flat end surface on the shoulder belt side and a flat or substantially flat end surface on the lap belt side,
wherein for at least some of the predetermined number of protrusions, an intersection point between an imaginary line drawn from the topmost end of the protrusion to an arc center of an outer peripheral surface of the concave portion and an imaginary circular arc having the same radius as the circular arc of the outer peripheral surface of the concave portion corresponding to the protrusion is located closer to the end surface on the shoulder belt side than the position of a center of the imaginary circular arc in the circumferential direction corresponding to a base of the protrusion.

12. The tongue according to claim 11, wherein each of the concave portions is formed so as to have an arc-like outer peripheral surface in cross section in a direction perpendicular or substantially perpendicular to the length direction of the seat belt insertion hole.

13. The tongue according to claim 11, wherein the seat belt sliding surface includes at least a first end seat belt sliding surface and a second end seat belt sliding surface disposed on either end of the seat belt insertion hole and extending in the length direction of the seat belt insertion hole.

14. The tongue according to claim 11, wherein the top end of each of the protrusions is formed in a substantially spherical shape.

15. A seat belt apparatus comprising:
a seat belt;
a seat belt retractor configured to retract the seat belt;
a tongue slidably supported by the seat belt; and
a buckle that allows the tongue to be inserted thereinto and engaged therewith,
wherein an occupant wears the seat belt by inserting the tongue into the buckle and engaging the tongue with the buckle, and
wherein the tongue is defined as the tongue according to claim 11.

* * * * *